Aug. 11, 1942.  W. J. COULTAS  2,292,362
MOWER
Filed Feb. 23, 1939  6 Sheets-Sheet 1

INVENTOR:
WILBUR J. COULTAS
BY
ATTORNEYS.

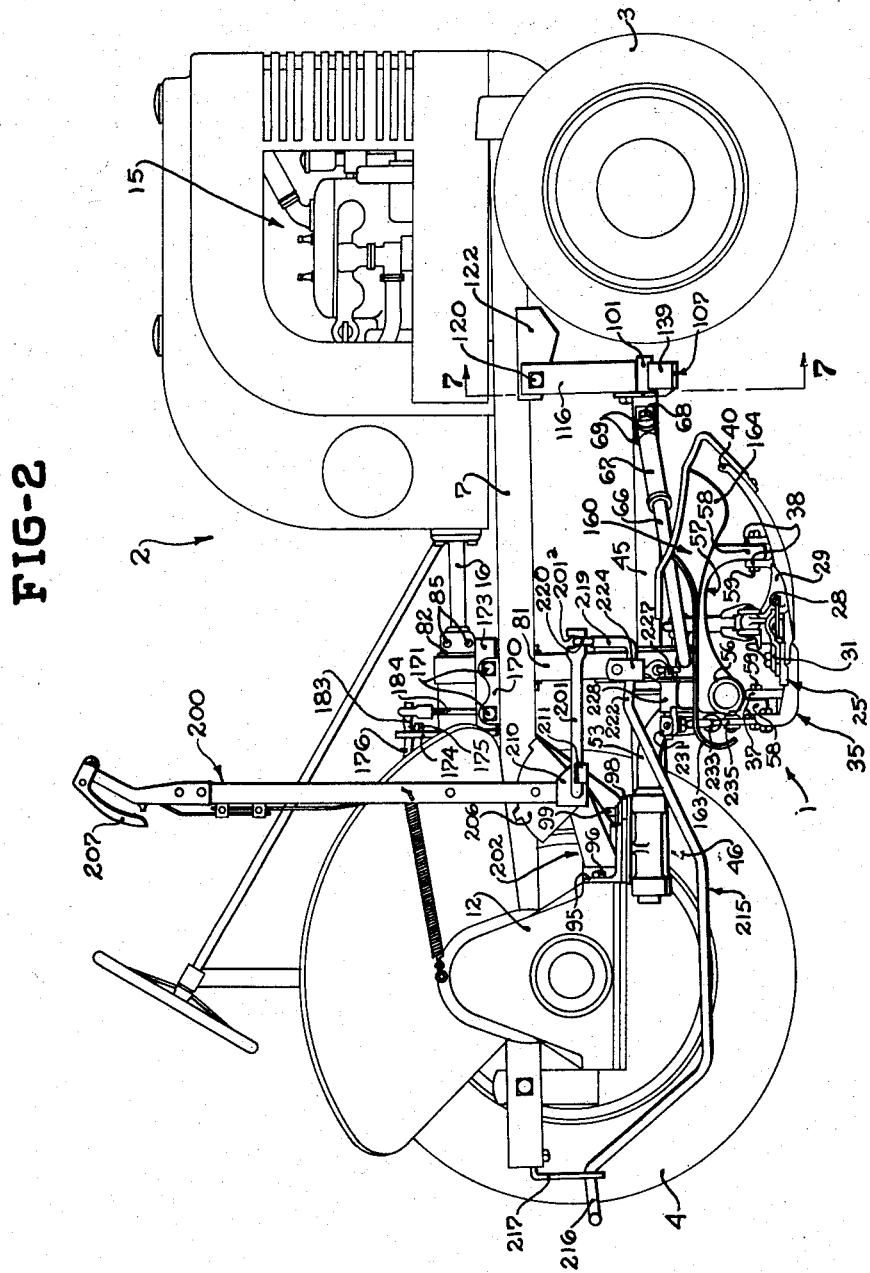

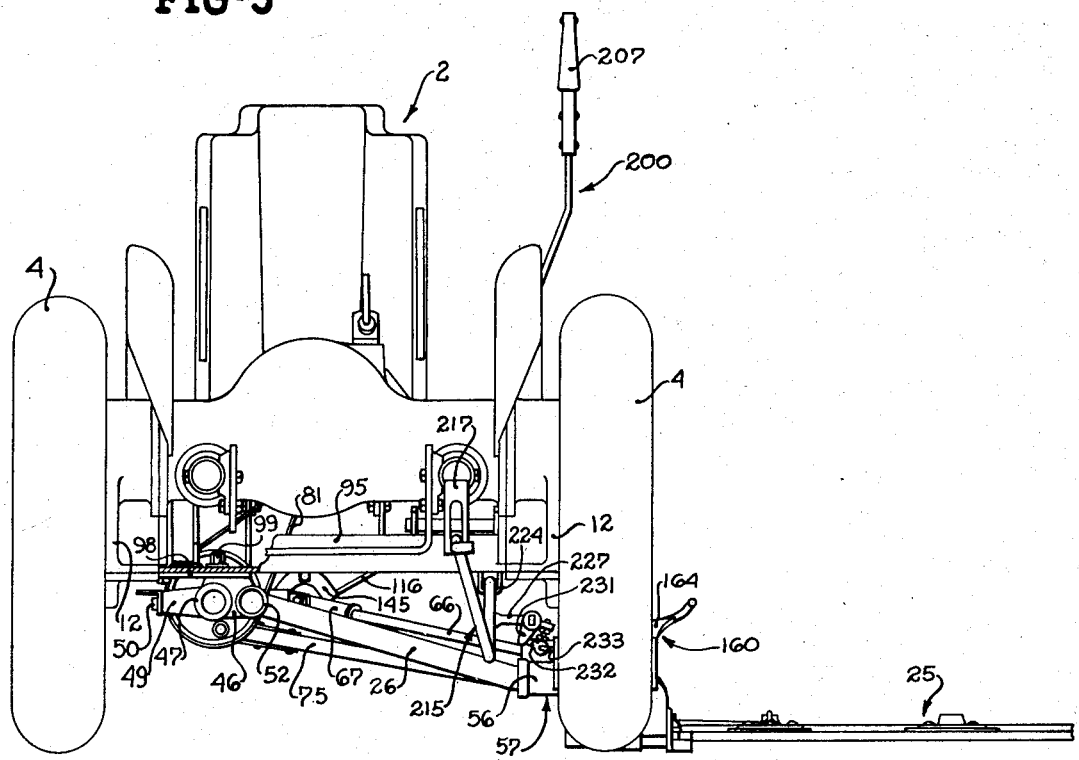
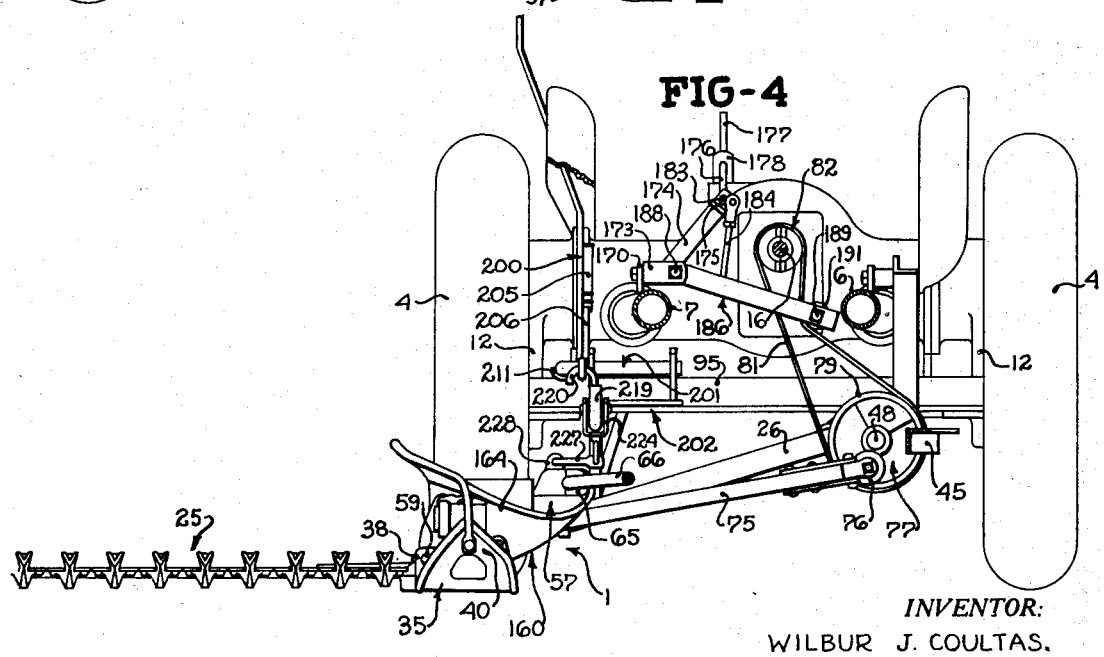

Aug. 11, 1942.  W. J. COULTAS  2,292,362
MOWER
Filed Feb. 23, 1939  6 Sheets-Sheet 4

INVENTOR:
WILBUR J. COULTAS
BY
Brown, Jackson, Boettcher & Dienner
ATTORNEYS.

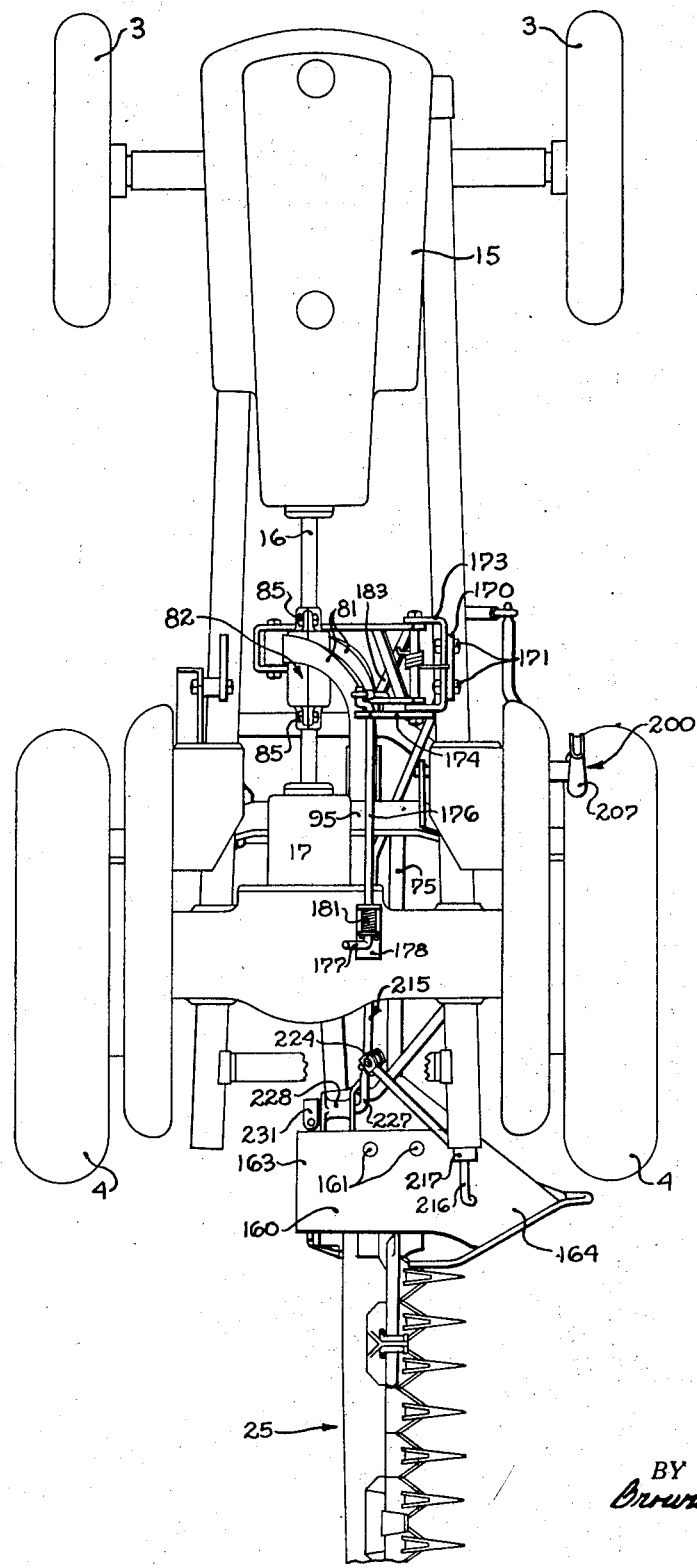

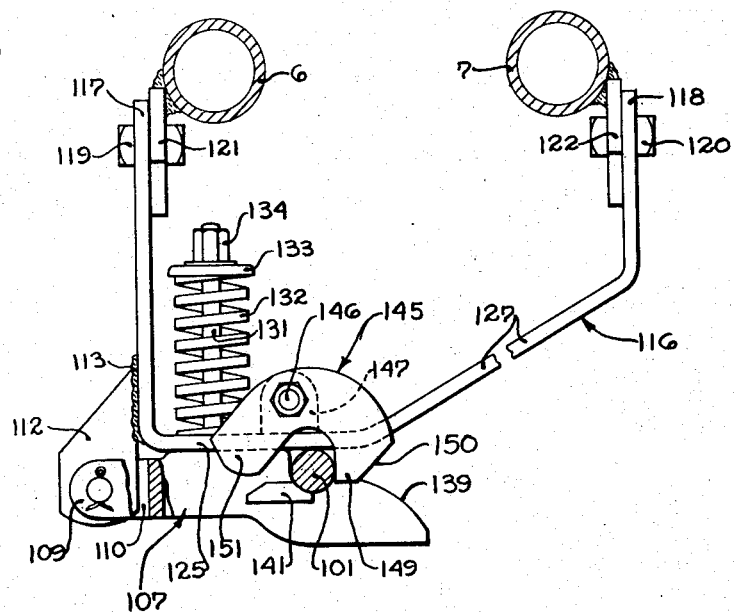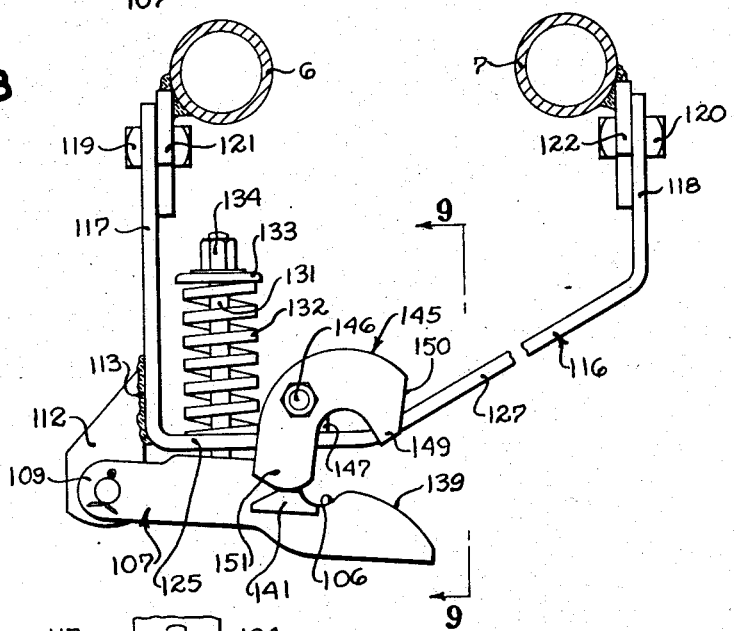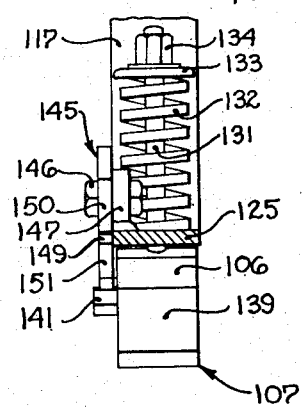

UNITED STATES PATENT OFFICE 2,292,362

MOWER

Wilbur J. Coultas, Moline, Ill., assignor to Deere & Company, Moline, Ill., a corporation of Illinois Application February 23, 1939, Serial No. 257,804

31 Claims. (Cl. 56—25)

The present invention relates generally to agricultural implements, and is more particularly concerned with mowing machines, especially those adapted to be mounted on and operated by a farm tractor.

The object and general nature of this invention is the provision of an improved mowing unit particularly adapted to be attached to the intermediate part of the tractor, that is, between the front and rear wheels, so that the operator of the tractor has a full view of cutting operations at all times, and by attaching the mowing unit directly to the frame of the tractor, the tractor frame acts as the frame of the mower, producing a moving outfit which is exceedingly compact and simple, yet sturdy, efficient and long lived in operation.

One of the principal objects of the invention is concerned with the provision for swinging the cutter bar rearwardly about a pivot support on the tractor when the cutter bar strikes an obstruction, such as a tree stump or rock, during mowing operation. Although many tractor mowers in the prior art are adapted to be released for rearward swinging upon encountering an obstruction, a serious compromise has heretofore been necessary in the design of those mowers which are mounted ahead of the rear tractor wheels. In such mowers, it has been necessary to mount the mower for rearward swinging about a pivot located outside of the wheels of the tractor, in order that the cutter bar will not interfere with the tractor wheel when swinging back to trailing position. Hence, the conventional tractor mower of this type is adapted to swing about a vertical axis disposed at the inner end of the cutter bar. While satisfactory operation was obtained when the outer portion of the cutter bar encountered the obstruction, the results were not satisfactory when the obstruction was struck by the inner portion of the cutter bar at or near the pivot axis. In such case, the force of impact required to release the cutter bar for rearward swinging was much greater, due to the shorter moment at which the force was received. Obviously when the mower shoe itself struck an obstruction directly in line with the pivot axis, damage to the equipment was practically inevitable, with the attending danger of injury to the operator.

Consequently, the commercial development of tractor-mounted mowers has heretofore been directed mainly to mowers of the type which is mounted behind the rear wheels of the tractor, permitting the cutter bar to be supported on a member which is pivoted at the opposite side of the tractor, and thus providing a substantial moment arm against the releasable latch even in the case where an obstruction is encountered by the shoe at the inner end of the cutter bar. Of course, the rearward swinging cutter bar mounted behind the tractor does not interfere with the tractor wheel when it is released.

There is, however, an important advantage obtained by mounting the mower ahead of the rear wheels, namely, better visibility from the operator's seat on the tractor. Therefore, one of the principal objects specifically, is to provide a mower which can be mounted ahead of the rear wheels of a tractor and pivoted at the opposite side of the latter for rearward swinging movement, but includes means whereby the rear wheel of the tractor is lifted over the top of the cutter bar as the latter swings rearwardly, without injury to the equipment or to the operator. In accomplishing this object, I have provided a ramp-like shield disposed over the mower shoe in line with the rear wheel of the tractor, over which the latter can roll as the cutter bar swings rearwardly. The ramp is so formed as to permit the tractor wheel to be backed over the ramp to return the cutter bar to operative position.

Still further, another feature of this invention is the provision of a cutter bar connected to a drag bar, the latter being pivoted for generally horizontal swinging movement to the far side of the tractor and connected with a forwardly extending portion which is adapted to be engaged by suitable safety release latch mechanism carried by the tractor.

A further feature of this invention is the provision of a novel form of latch mechanism which, while affording sufficient resistance to the release of the cutter bar to hold the latter in working position under all normal conditions, does not require excessive force to restore the parts to their working position. Specifically, the present invention provides means controlled by the release of the cutter bar for automatically holding the latch in an open position to receive the latching stud that is a part of the mower frame but without requiring that the stud be moved into locking or latched position against the bias of the latch.

These and other objects and advantages of my invention will be apparent to those skilled in the art after a consideration of the following detailed description, taken in conjunction with the accompanying drawings illustrating the preferred structural embodiment of this invention.

In the drawings:

Figure 2 is a side view of the machine shown in Figure 1;

Figure 3 is a rear view of the machine shown in Figure 1;

Figure 4 is an intermediate sectional view taken along the line 4—4 of Figure 1;

Figure 6 is a view similar to Figure 5 but showing the cutter bar swung completely to the rear in a trailing position;

Figure 7 is a vertical section, looking forwardly, taken generally along the line 7—7 of Figure 2;

Figure 8 is a section similar to Figure 7 but showing the latch in open position; and Figure 9 is a vertical section, taken substantially along the line 9—9 of Figure 8.

Figure 1:
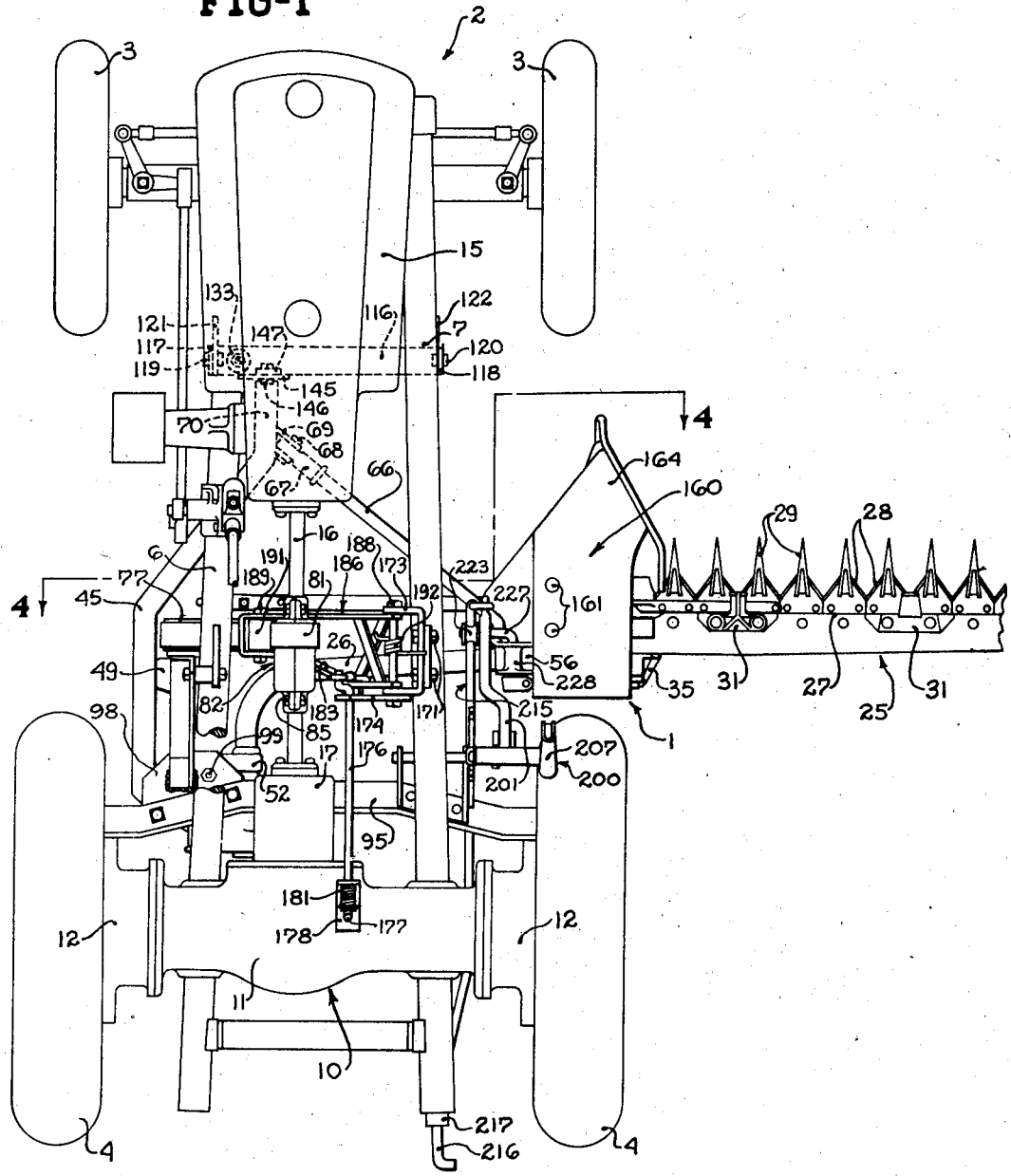
Figure 1 is a plan view of a tractor mounted mower in which the principles of the present invention have been embodied.

Referring now to the drawings, more particularly to Figures 1 to 4, the mower is indicated in its entirety by the reference numeral 1 and is attached to a tractor indicated by the reference numeral 2. The tractor includes front wheels 3, rear wheels 4, and laterally spaced generally longitudinally extending frame bars 6 and 7. The rear axle of the tractor 2 is indicated at 10 and includes a housing 11 of the banjo type, to the ends of which gear housings 12 are fixed. The wheels 4 are journaled on suitable stub axles carried by the gear housings 12. The motor of the tractor 2 is indicated at 15 and, through a suitable main clutch, drives a longitudinally extending main shaft 16 which extends to a transmission unit 17, the housing of which is bolted directly to the rear axle housing 11.

The mowing unit 1 includes a cutter bar 25 and a drag bar or arm 26 which serves to connect the cutter bar 25 to the tractor 2. The cutter bar 25 is of more or less conventional construction, and includes a reciprocable sickle 27 having knife sections 28 movable within stationary guides 29 bolted to the cutter bar proper. Suitable knife holders 31 are also bolted to the cutter bar proper to hold the sickle 27 in proper position. An outer shoe (not shown) is fixed to the outer end of the cutter bar proper, the inner end of the latter being securely fixed to an inner shoe 35. The latter includes two pairs of apertured lugs 37 and 38 and a forwardly and upwardly inclined point 40.

Figure 5:
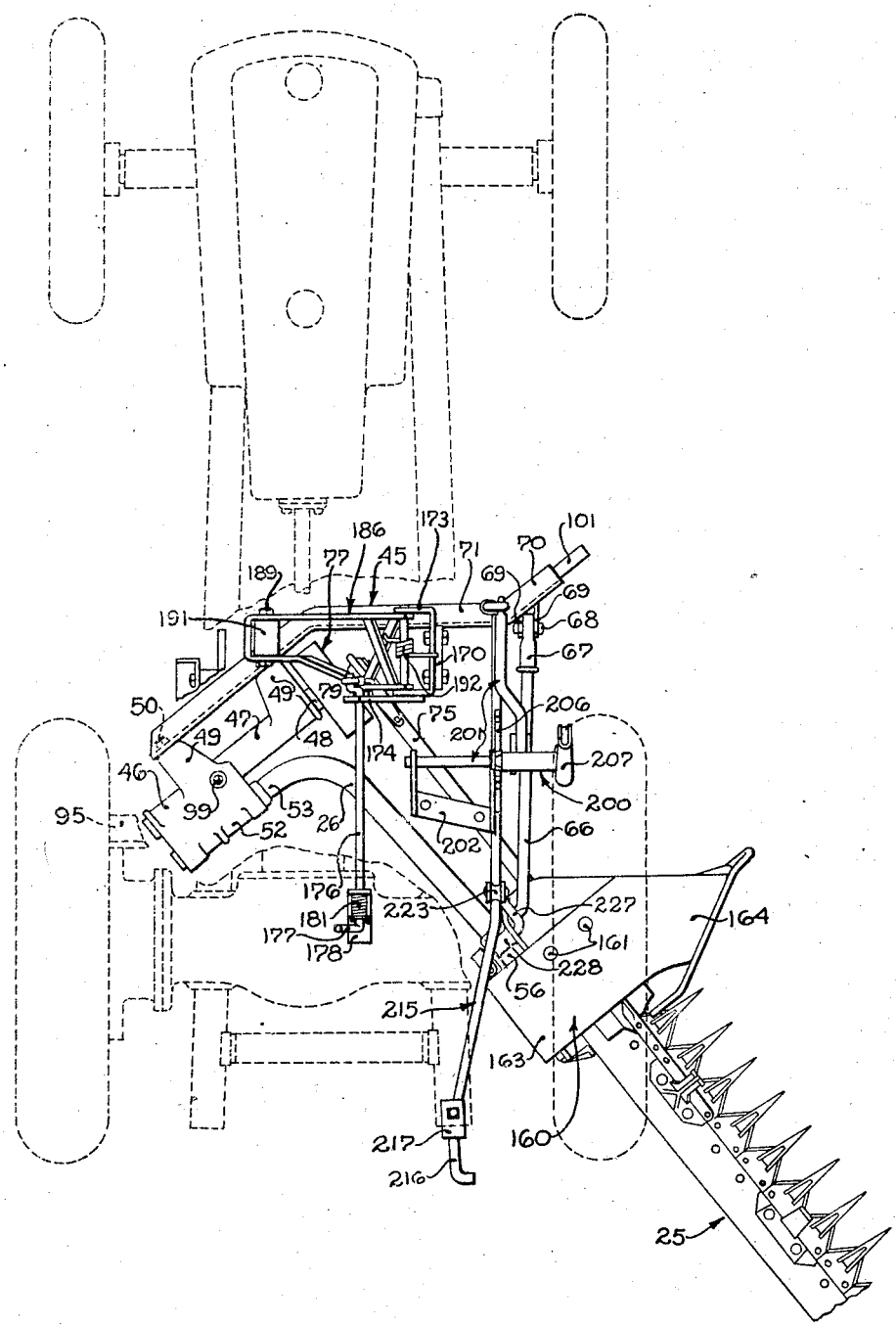
Figure 5 is a plan view, showing the position of the mower parts when the cutter bar strikes an obstruction and swings rearwardly, passing underneath the right hand rear tractor wheel.

A main support angle 45 is fixed at its rear end to housing 46 (Figure 5) which is provided with a sleeve extension 47 in which a pitman shaft 48 is journaled for rotation. Preferably, the housing 46 includes a pair of lugs 49 which are bolted, as at 50, to the rear end of the main support angle 45. The housing 46 also includes a sleeve section 52 in which the rearwardly bent end 53 of the drag bar 26 is journaled for rocking movement. The other or right hand end (Figure 1) is received in a socket 56 formed in a yoke 57 having apertured lugs 58 to which the pairs of lugs 37 and 38 (Figure 2) are pivoted, as by pivots 59. The yoke 57 carries a lug 65 (Figure 4) to which the rear or outer bent end of a pull bar 66 is loosely connected. The forward end of the pull bar 66 is threaded and receives a sleeve 67 which is loosely connected by a pivot bolt 68 to a pair of lugs 69 which are secured, as by welding or the like, to the forward end 70 of the main support angle 45. The intermediate portion 71 of the main support angle 45 is disposed angularly so as to bring the section 70 and the pivot 68 substantially in line with the journal support for the rearwardly bent end 53 of the drag bar 26, as best indicated in Figure 5. A pitman 75 is connected to the crank portion 76 of a pitman flywheel 77 which is fixed to the forward end of the pitman shaft 48. The pitman flywheel 77 carries or is formed with a suitable pulley section 79 over which a belt 81 is trained. The belt 81 extends upwardly and passes around a split pulley 82 bolted, as at 85, about the longitudinal tractor shaft 16.

The tractor 2 is provided with a drawbar angle 95 which is bolted, as at 96, (Figure 2), at its opposite ends to the front surfaces of each of the tractor gear housings 12. At the right side of the tractor, the bar 95 carries a bracket 98 (Figures 1 and 3), and a pivot bolt 99 (Figures 1, 3, and 5) pivotally connects the pitman housing 46 and the associated frame bars to the tractor supported bracket or plate 98, which is at the left side of the tractor as best shown in Figure 1, while the cutter bar 25 extends from the right side of the tractor between the front and rear wheels 3 and 4.

The cutter bar 25 is latched to the tractor by a safety release mechanism which normally holds the cutter bar in the position shown in Figure 1 but which, should the cutter bar strike an obstruction in operation, permits the cutter bar to swing rearwardly about the vertical pivot established by the bolt 99 until the cutter bar clears the obstruction or swings into a rear trailing position, as indicated in Figure 6. The safety release mechanism will now be described.

The forward end 70 of the main support angle 45 carries a latching section in the form of a bar or stud 101 (Figures 5 and 7) which, in normal operation, is disposed in a recess 106 formed in a latch 107, one end of which is bifurcated to form lugs 109 and 110 which are disposed on opposite sides of a bracket 112 which is welded, as at 113, to a U-shaped vertically depending standard 116. The latter includes sections 117 and 118 which are fixed, as by bolts 119 and 120, to suitable brackets 121 and 122 which are welded to the frame bars 6 and 7. The section 117 of the standard 116 extends downwardly and is joined to an intermediate portion 125 from which an upwardly and laterally inclined section 127 extends to the other bolting section 118. The intermediate portion 125 is apertured to receive a rod 131 about which a biasing spring 132 is disposed. The lower end of the spring 132 bears against the standard section 125, and the upper end of this spring bears against a cap 133, the position of which along the bolt 131 is adjusted by a nut 134. The lower end of the bolt 131 is pivoted to the forward side portion of the latch 107. The force of the spring 132 is exerted through the bolt 131 to hold the latch 107 up against the standard section 125, as shown in Figure 7. The end of the latch 107 adjacent the recess 106 is formed with a cam surface indicated at 139, and a lug 141 is formed on or carried by the latch 107 at the other side of the recess 106.

The latch locking lever 145 is connected by means of a pivot bolt 146 to a bracket 147 that is formed on the standard 116 adjacent the spring 132. The latch locking lever includes a first section 149 having an inclined nose portion 150 and a second latch engaging section 151. The first section 149 is heavier than the other section, so that normally the lever 145 occupies the position shown in Figure 7 when the mower frame and cutter bar are in operating position with the latching section or stud 101 latched in the recess 106. If the cutter bar should encounter an obstruction, whether adjacent the outer shoe of the cutter bar or adjacent the inner shoe thereof, the continued forward travel of the tractor exerts sufficient force to cause the mower frame to swing, relative to the tractor, from the position shown in Figure 1 backwardly toward the positions shown in Figures 5 and 6, thus forcing the stud 101 out of the recess 106 against the force exerted by the spring 132 through the latch 107. As the stud 101 leaves the latch it swings the locking lever 145 in a counterclockwise direction (Figure 7) and brings the locking section 151 into engagement with the lug 141 on the latch 107. The position of the pivot 146 is such that in this position the lever 145 is effective to hold the latch 107 open and in a position to receive, without material restraint, the stud 101 when the mower is restored to its operating position, as will be referred to below.

Since the cutter bar 25 extends outwardly from the right side of the tractor forward of the right rear wheel, the rear swinging movement of the cutter bar and mower frame about the vertical pivot 99 brings the mower into a position under the right rear wheel of the tractor. To facilitate the wheel passing over the mower, the yoke 57 carries a plate or shield in the form of a ramp 160 suitably secured thereto, as by bolts 161 (Figure 6). As best indicated in Figure 2, the rear portion 163 of the ramp 160 is curved downwardly along the rear edge thereof to permit the right hand rear tractor wheel to roll up over the ramp when the mower swings rearwardly relative to the tractor into the position shown in Figure 5. The forward portion 164 is curved downwardly and inwardly to provide a track for the wheel to roll off the forward end of the ramp, thereby permitting the mower to swing to a trailing position behind the tractor, as indicated in Figure 6. It will be observed from Figures 4, 5, and 6 that the curved portion 164 extends generally arcuately with respect to the pivot 99 about which the mower frame and cutter bar swing when released by the latch mechanism described below.

Thus, when in operation should the cutter bar strike an obstruction, the force exerted by the continued forward travel of the tractor forces the stud 101 outwardly, releasing the mower frame and permitting the mower to swing rearwardly into a trailing position, the right hand rear tractor wheel passing over the mower ramp 160. To restore the mower to operating condition, all that the operator has to do is to back the tractor. Since the pivot 99 is to one side, the backward movement of the tractor causes the mower to swing forwardly relative to the tractor, the right hand rear wheel passing up over the curved portion 164, over the ramp 160, and down the curved rear end 163 thereof, in substantially the reverse of the operation mentioned above. This swinging movement of the mower about the pivot 99 reengages the latching section and stud 101, swinging the stud back into position in the latching mechanism. During this movement, the stud 101 first engages the section 151 of the latch locking lever 145, forcing the section 151 in a clockwise direction about the pivot 146 and away from the lug 141 on the latch 107. The spring 132 is then effective to clamp the stud 101 in the recess 106, in the position shown in Figure 7, thereby holding the mower in normal operating position (Figure 1).

As mentioned above, the driving connection between the pulley 82 on the tractor power shaft 16 and the pitman flywheel 79 takes the form of a belt 81. The drive may be manually controlled by means of a shiftable idler which, as desired, may be moved into a position to tighten the belt and transmit power, or into a position away from the belt, loosening the same and permitting the power pulley 82 to rotate idly. The drive controlling shiftable idler will now be described.

A bracket 170 (Figures 2 and 4) is fixedly secured, as by welding or the like, to the frame member 7 and receives a pair of bolts 171 by which a U-shaped bracket 173 (Figures 1 and 6) is secured to the bracket 170, and to one portion of the bracket 173 is secured a supporting strap 174 on which a stop 175 is carried. A rod in the form of a throw-out lever 176 is mounted at its inner or forward end on the strap 174, and the rear end of the throw-out lever 176 is provided with a handle section 177, this end of the lever 176 being supported for rocking movement in a bracket 178 fixed to the rear axle of the tractor, preferably by means of one of the bolts (not shown) which fastens the seat channel to the tractor axle. A spring 181 has one end fixed to the bracket 178 and the other end fixed to the rocking lever 176 for the purpose of holding the lever in one of its positions. The inner end of the crank lever 176 is provided with a crank portion 183 which receives the upper end of a link 184, the lower end of which is pivoted to one side of a U-shaped swinging idler support 186, and is mounted for rocking movement in the bracket 174. The ends of the U-shaped idler support 186 are pivoted for hinging movement on a pivot bolt 188 carried by the bracket 173, and the outer or swinging end of the support 186 receives a bolt 189 upon which an idler pulley 191 is journaled. As best shown in Figure 4, the idler pulley 191 receives the belt 81 and, when the crank lever 176 is in the position shown in this figure, the idler 191 maintains the belt 81 tight so as to transmit the drive from the split pulley 82 to the pitman pulley 77. From Figure 1 it will be seen that the belt 81 operates between the two arms of the U-shaped idler support 186. The spring 192 reacts against the bracket 173 and the idler support 186 to maintain the proper driving tension in the belt 81.

By swinging the handle section 177 from the position shown in Figure 4 to the other side until the forward or crank end of the rod engages the stop 175, the idler support 186 is raised. This lifts the idler 191 away from the belt 81, loosening the same and interrupting the drive.

It will be noted from Figure 4 that the pitman pulley 77 is disposed adjacent to the side of the tractor at which the vertical pivot 99 (Figure 1) is disposed, while the driving pulley 82 is in the central part of the tractor. Therefore, when the cutter bar encounters an obstruction and swings rearwardly, the swinging movement of the drag bar 26 carries the pitman pulley 77 toward a position directly underneath the driving pulley 82, since the pulley 77 is forward of the pivot 99 (Figure 1) thereby automatically loosening the belt 81 and interrupting the drive, regardless of the position of the idler 191 or the idler controlling crank lever 176. However, upon the return of the cutter bar to its working position, the belt 81 is automatically tightened and the drive restored. When the belt is loosened, the engagement of the rod portion 183 with the stop serves to prevent the idler pulley 191 from dropping further.

The cutter bar is raised and lowered about the pivot axis established by the bolts 59 (Figure 2) by means of a hand lever 200, the lower end of which is pivoted on the portion of a lifting lever crank 201 that is mounted for rocking movement in a U-shaped bracket 202 which is adapted to be fixed to the draw-bar angle 95 as best shown in Figure 4. The lifting lever includes latch mechanism 205 mounted on the inner side of the lever and arranged to engage a sector 206 securely fixed to one arm of the U-shaped bracket 202. The latch mechanism 205 is controlled by means of a hand grip 207 mounted at the upper end of the lever 200.

The lower end of the lever 200 carries a member 210 fixed thereto, which includes a section 211 that underlies the forwardly extending part of the lifting lever crank 201, the forward end of the latter including a notched portion 201a, as best shown in Figure 2. Thus, when the lever 200 is swung rearwardly, to the left as viewed in Figure 2, the member 210 exerts a lifting force upon the lifting lever crank 201, but when necessary the crank 201 may swing upwardly relative to the cradle section 211 of the lever 200 without restraint.

A longitudinally extending rod 215 has its rear end 216 supported in a slotted bracket 217 fastened to the rear end of the tractor frame member 7. The forward end of the longitudinally extending rod 215 is bent upwardly, as at 219, and is formed with an eye 220 which is engaged in the notch 201a of the lifting crank 201. At its forward end the rod 215 is provided with a straight portion 222 which receives a roller 223 (Figure 5). The roller 223 is mounted on a yoke 224 which has a swiveled connection with the laterally inner end of a lifting crank 227 which is journaled for rocking movement in a sleeve section 228 formed on the yoke 57 to which the drag and pull bars 54 and 66 are connected. The rear end of the lifting crank 227 carries an arm 231 (Figure 3) which is connected by means of a link 232 and chain 233 to an arm 235 (Figure 2) which is bolted or otherwise fixed to the lug 37 of the cutter bar inner shoe 35.

By virtue of the construction just described, pulling the lever 200 rearwardly exerts an upward force on the forward end of the rod 215, and this in turn exerts an upward pull on the inner end (Figure 4) of the lifting crank 227, rocking the latter in the sleeve socket 228 of the yoke casting 57. This swings the arm 231 (Figure 3) in a clockwise direction and exerts a pull through the chain 233 against the upper end of the arm 235 (Figure 2) which swings the inner shoe 235 of the cutter bar abcut the axis defined by the pivots 59, thus raising the cutter bar vertically into inoperative position and also raising the right end of the mower drag bar 26. The bar or rod 215 upon which the roller 223 is carried is provided so as to accommodate the rearward swinging movement of the mower, as will be clear from Figure 5, but during normal operation the roller 223 remains on the horizontal portion 222 of the rod 215 and through which the lever 200 is effective to swing the lifting crank 227. No claim is made in this application to this particular structure.

While I have shown and described above the preferred structure in which the principles of the present invention have been embodied, it is to be understood that my invention is not to be limited to the particular details shown and described above, but that, in fact, widely different means may be employed in the practice of the broader aspects of my invention.

What I claim, therefore, and desire to secure by Letters Patent is:

1. In combination, a mobile frame having a supporting wheel, an implement, means mounting said implement on said frame ahead of said wheel and providing for rearward movement of said implement under said wheel to a position behind the latter as the frame advances, and means for lifting said wheel over said implement as the latter moves relative to said frame to a position rearward of said wheel.

2. A mower adapted to be mounted on a tractor, comprising a drag bar, a cutter bar connected with one end of the drag bar and adapted in operation to extend laterally outwardly from one side of the tractor between the front and rear wheels thereof, means pivoting the other end of said drag bar to the other side of the tractor for swinging movement about a generally vertical axis providing for swinging the cutter bar to a rearwardly trailing position, and means on said mower for lifting one of said rear wheels over the mower as the latter swings to said rearwardly trailing position.

3. The combination with a light weight tractor having front and rear wheels provided with pneumatic tires, a mower disposed ahead of certain of said tractor wheels and pivoted to one side of the tractor for generally horizontal swinging movement and extending to the other side thereof, latch means normally holding said mower against horizontal swinging, a cutter bar extending laterally outwardly in normal operation at said other side of the tractor, and a shield carried by said mower at said other side of the tractor in a position to receive one of said wheels at said other side of the tractor when said latch means is released by the cutter bar striking an obstruction and swinging rearwardly with the mower as the latter pivots about the vertical axis at said one side of the tractor, said shield including a wheel-receiving portion that is curved generally about the axis of the vertical pivot between the mower and the tractor.

4. A tractor-mounted mower comprising a generally horizontally swingable drag bar, a member connected therewith and extending forwardly therefrom, means pivoting said drag bar for movement about a generally vertical axis at one side of the tractor, a cutter bar connected to said drag bar at the other side of the tractor and extending laterally outwardly thereof forward of the rear wheel at said other side of the tractor, and releasable latch mechanism carried by the tractor adjacent its forward portion and releasably receiving the forward portion of said member, said latch means releasing said member when the cutter bar strikes an obstruction and swings rearwardly and said rear tractor wheel passing over said drag bar when the forward travel of the tractor continues after the mower and cutter bar continue to swing rearwardly relative to the tractor.

5. The combination of a light weight tractor having rear wheels with pneumatic tires and a rigid cross bar secured to the frame of the tractor, a bracket secured to said cross bar adjacent one side of the tractor and below the frame of the latter, a casing pivoted to said bracket for movement about a generally vertical axis, a drag bar rockably mounted at one end in said casing, a latch bar fixed to the latter, said drag bar extending at its other end to the other side of the tractor, releasable latch means engageable with said latch bar for yieldingly securing said drag bar against swinging movement about said axis, a cutter bar secured to said other end of the drag bar and extending laterally outwardly from said other side of the tractor, and means providing for movement of the drag bar under the rear wheel at said other side of the tractor when the cutter bar strikes an obstruction and effects the release of said latch means.

6. A tractor-mounted mower comprising a housing pivoted to the frame of the tractor forward of the rear wheels for generally horizontal swinging movement about a vertical axis, a generally forwardly extending frame bar fixed at its rear end to said housing and carrying a latching section at its forward end, a drag bar extending generally transversely in normal operation and having a rearwardly disposed journal portion mounted for rocking movement in said housing, a yoke carried at the outer end of said drag bar and disposed in normal operation at the side of the tractor opposite said vertical pivot, a pull bar connected at one end to said yoke and extending laterally inwardly and forwardly to a point adjacent the forward end of said forwardly extending frame bar, pivot means disposed generally in line with the axis of the journal portion of said drag bar, whereby said yoke and drag and pull bars can swing generally vertically relative to said forwardly extending frame bar, a cutter bar hinged to said yoke and extending laterally outwardly of the tractor forward of the rear wheels and laterally outwardly of said vertical pivot, and releasable latch means carried by said tractor and engageable with said latching section for holding said cutter bar in operating position.

7. A mower as set forth in claim 6 wherein said cutter bar includes a reciprocable knife and said housing is provided with a sleeve portion receiving a pitman shaft which is operatively connected to said knife by a pitman.

8. A tractor-mounted mower comprising a drag bar pivoted to one side of the tractor between the front and rear wheels thereof for horizontal swinging movement about a generally vertical axis, a cutter bar connected to the drag bar at the other side of the tractor, a latch bar mounted for swinging movement about said axis and braced against horizontal swinging movement relative to said drag bar, and latch means carried by the tractor separate from said drag bar for releasably receiving said latch bar and acting through the latter to hold the mower in working position.

9. A tractor-mounted mower as defined in claim 8, wherein said latch means includes a yoke fastened to the tractor at opposite sides thereof and having an intermediate depending portion, a latch pivoted to said depending portion, said pivoted latch having a recess to receive said latch bar, and biasing means for urging said latch into closed position.

10. For use with a mower having a safety release and including a cutter bar swingable rearwardly upon encountering a field obstruction, the combination of a latching stud swingable with the cutter bar, a latch pivotally carried by the tractor, spring biasing means for holding the latch closed over said stud so as to releasably hold the cutter bar in working position, said latch yielding when the cutter bar strikes an obstruction, a pivoted member carried adjacent said latch and including a portion normally lying in front of said latching stud when the latter is in latched position and a second portion movable by said latching stud when said latching stud is forced out of said latch by the cutter bar striking an obstruction, said second portion moving into a position engaging the latch to hold the latter against said spring biasing means, the return of said latching stud into said latch engaging said second portion of said locking member for unlocking the latch and permitting it to move into closed position about said latch stud.

11. Latching mechanism for a tractor mounted mower having a horizontally swingable mower carrying a latch stud, said mechanism comprising a support yoke adapted to be secured to opposite sides of the tractor and including a downwardly disposed intermediate section adjacent one side of the tractor, a bracket carried by said section, a latch having a cam end, a stud receiving recess and a bifurcated end, pivot means pivotally connecting the bifurcated end of said latch to said bracket for swinging movement toward and away from a closed position, spring means urging said latch into said closed position, a bracket fixed to said yoke on the side thereof opposite said latch, and a member pivotally mounted on said last mentioned bracket, said member having a section adapted to lie on the other side of said stud when the latter is latched in said recess, said member also including an abutment end on the opposite side of the pivot and adapted to engage a lug on said latch when said stud is moved out of said latch recess, said stud engaging said section and swinging the abutment end into a position to engage said lug and hold said latch in a position to receive said stud upon its return.

12. The combination with a tractor having a longitudinally extending power shaft, laterally spaced longitudinally extending frame bars, and front and rear wheels, of a bracket fixed to one of said frame bars, an arm, pivot means connecting said arm to said bracket for generally horizontal swinging movement about a vertical axis at one side of the tractor, said arm extending to the other side of the tractor, a cutter bar connected to said arm at said other side of the tractor between said front and rear wheels, a split pulley adapted to be mounted on said longitudinally extending power shaft, a pitman wheel having a pulley associated with said arm and swingable therewith about said pivot and operatively connected with said cutter bar, a driving belt adapted to be trained over said split pulley and said pitman pulley, a belt tightener frame pivoted adjacent one end to the other of said frame bars and carrying an idler pulley at its other end engageable with said belt, and means carried by the tractor for swinging said belt tightener frame for tightening or releasing said belt to connect or disconnect the drive from said split pulley to said pitman pulley.

13. The combination defined in claim 12 wherein said arm is pivotally connected to said bracket for generally rearwardly swinging movement, safety release latch mechanism releasably latching said arm in working position, said arm swinging rearwardly when said cutter bar strikes an obstruction and said rearward swinging movement of the arm carrying said pitman pulley generally laterally inwardly relative to the tractor so as to loosen said belt and disconnect the drive independently of the position of said belt tightener frame.

14. The combination set forth in claim 12 in which said arm is pivotally connected to said bracket for generally rearwardly swinging movement, safety release latch mechanism releasably latching said arm in working position, said arm swinging rearwardly when said cutter bar strikes an obstruction, a ground-engaging shoe is carried at the end of said arm at said other side of the tractor in line with the rear wheel at said other side of the tractor, and a ramp plate carried by said arm to receive said rear wheel when the frame and cutter bar swing rearwardly upon the release of said latch mechanism.

15. In a mower, a supporting frame, a cutter bar pivotally mounted thereon by means providing for generally rearwardly swinging movement out of operating position, a knife associated with said cutter bar, means for driving said knife including a driving pulley rotatably mounted on said supporting frame and a driven pulley rotatably carried on said cutter bar mounting means and swingable therewith when the bar swings rearwardly, a power transmitting belt interconnecting said pulleys, the latter being so disposed eccentric to the cutter bar pivotal mounting that when said cutter bar swings rearwardly, said driven pulley moves closer to said driving pulley and loosens said belt to interrupt the drive, and means for retaining said belt trained over both of said pulleys while the cutter bar is rearward of said operating position, whereby said belt is automatically restored to driving relation when the cutter bar is restored to operating position.

16. In a mower, a supporting frame, a cutter bar pivotally mounted thereon by means providing for generally rearwardly swinging movement out of operating position, a knife associated with said cutter bar, means for driving said knife including a driving pulley rotatably mounted on said supporting frame and a driven pulley rotatably carried on said cutter bar mounting means and swingable therewith when the bar swings rearwardly, a power transmitting belt interconnecting said pulleys, belt tightening means engaging said belt, the latter being of sufficient length to permit the cutter bar to swing freely rearwardly, and means for retaining said belt trained over both of said pulleys while the cutter bar is rearward of said operating position, whereby said belt is automatically restored to driving relation when the cutter bar is restored to operating position.

17. In a mower, a supporting frame, a cutter bar pivotally mounted thereon by means providing for generally rearwardly swinging movement out of operating position, a knife associated with said cutter bar, means for driving said knife including a drive shaft rotatably supported at spaced points on said frame, a pulley fixed to said shaft between said points of support, a driven shaft having bearing means supporting the same on said cutter bar mounting means, a driven pulley disposed adjacent said bearing means, a pitman crank on the pulley opposite said bearing means, a pitman connected to said crank and to said knife, and a power transmitting belt trained over said pulleys and adapted to transmit power therebetween, said pulleys being so disposed eccentric to the cutter bar pivotal mounting that when the cutter bar swings rearwardly, said driven pulley moves closer to said driving pulley and loosens said belt to interrupt the drive, said belt being retained on said pulleys by means including the aforementioned shaft supporting means and pitman, whereby the belt is retightened on said pulleys when the cutter bar is restored to said operating position.

18. In a mower, a supporting frame, a cutter bar pivotally mounted thereon by means providing for generally rearwardly swinging movement out of operating position, a knife associated with said cutter bar, means for driving said knife including a driving pulley rotatably mounted on said supporting frame and a driven pulley rotatably carried on said cutter bar mounting means and swingable therewith when the bar swings rearwardly, a power transmitting belt interconnecting said pulleys, said belt being of sufficient length to permit the cutter bar to swing freely rearwardly, a belt tightener frame pivoted on said supporting frame and having members disposed along opposite sides of said belt and aiding in retaining the belt on the pulleys while the cutter bar is rearward of said operating position, whereby said belt is restored to driving relation on the pulleys when the cutter bar is restored to operating position, and an idler pulley journaled on said belt tightener frame and disposed to engage the belt to maintain the latter tight during operation.

19. For use with a tractor mounted mower including a member pivoted to the tractor for generally horizontal swinging movement, the combination of a bracket member fixed to said tractor, a spring biased latch carried on one of said members, a latching stud mounted on the other of said members and cooperative with said latch to yieldingly hold the mower in operating position, but adapted to yield when the mower encounters an obstruction during operation, and a separate holding member engaged by said stud when the pivoted member swings to disengage said latch and moved into engagement with said spring biased latch to hold the latter open in position to receive said latch stud when the mower is restored to normal position.

20. For use with a tractor mounted mower including a member pivoted to the tractor for generally horizontal swinging movement, the combination of a bracket member fixed to said tractor, a spring biased latch carried on one of said members, a latching stud mounted on the other of said members and cooperative with said latch to yieldingly hold the mower in operating position, but adapted to yield when the mower encounters an obstruction during operation, and a separate holding member engaged by said stud when the pivoted member swings to disengage said latch and moved into engagement with said spring biased latch to hold the latter open in position to receive said latch stud when the mower is restored to normal position, said holding member being released responsive to relative movement of said latch and stud into engagement.

21. For use with a tractor mounted mower including a member pivoted to the tractor for generally horizontal swinging movement, the combination of a bracket member fixed to said tractor, a latch stud supported on one of said members, a latch pivotally supported on the other of said members and cooperative with said stud, spring means for holding said latch closed over said stud but adapted to yield to release said pivoted member for rearward swinging movement when the mower encounters an obstruction during operation, and a pivoted holding member carried adjacent said latch and having a portion engaging said latching stud and rotated by the latter when the same is released from the latch, to a position in which said holding member holds the latch open, said member being engaged by said stud when the latter is restored to latching position, to release the holding member and permit the latch to reclose over the stud.

22. The combination with a tractor supported in front and rear carrying wheels, of a mower disposed ahead of certain of said tractor wheels and pivoted to one side of the tractor for generally horizontal swinging movement and extending to the other side thereof, latch means normally holding said mower against horizontal swinging, a cutter bar extending laterally outwardly in normal operation at said other side of the tractor, and a shield carried by said mower at said other side of the tractor in a position to receive one of said wheels at said other side of the tractor when said latch means is released by the cutter bar striking an obstruction and swinging rearwardly with the mower as the latter pivots about the vertical axis at said one side of the tractor.

23. A tractor-mounted mower comprising an arm, means pivotally connecting said arm to the tractor at one side of the latter and ahead of certain of the tractor wheels, said arm extending generally laterally to the other side thereof and having a yoke disposed at said other side of the tractor, latch means carried by the tractor and releasably holding said arm in position, a cutter bar pivoted to said yoke and extending laterally outwardly from said other side of the tractor during normal operation, and a shield plate carried by said yoke in a position to receive the wheel behind the mower and permit said wheel to pass over said arm when the cutter bar strikes an obstruction and said latch means releases to permit the mower to swing rearwardly during forward travel of the tractor.

24. A mower attachment for a tractor having a belt pulley, said attachment comprising a main frame adapted to be attached to the tractor adjacent the tractor pulley, a mower frame, means mounting said mower frame on said main frame for lateral swinging about a point to one side of the tractor pulley in a direction toward the tractor pulley, a drive shaft on said mower frame having a pulley lower than said tractor pulley, said mower pulley being swingable with said mower frame laterally to a position underneath the tractor pulley, a belt trained over said pulleys to drive said mower pulley during normal operation and means maintaining said belt trained over said pulleys during said swinging movement, so that said belt is returned to driving relation when said mower is returned to normal operating position.

25. In a mower, a supporting frame, a pair of laterally spaced ground wheels journaled thereon, a driving pulley on the frame, a cutter bar structure including cutting mechanism extending laterally from said frame beyond one of said wheels in operating position, a pivot connecting the cutter bar structure to said frame for swinging movement from said operating position to an inoperative position in which the outer end thereof does not extend outwardly of said wheel, a driving train including a driven pulley on said cutter bar structure for driving said cutting mechanism, a belt trained over said pulleys to drive said driven pulley, said pivot being spaced away from said pulleys, whereby when said cutter bar structure is swung rearwardly to said inoperative position, the driven pulley moves to a position in which the length of the circuit of said belt around said driving train is shortened, thereby loosening the belt and interrupting the transmission of power but retaining the latter loosely trained over said pulleys in a position in which it is automatically retightened when the cutter bar structure is swung back to operative position.

26. A tractor mounted mower comprising a cutter bar structure including cutting mechanism, pivot means for connecting said structure to a tractor at one side of the latter, said structure extending laterally from the opposite side of the tractor in front of one of the tractor wheels and swingable about said pivot means to an inoperative position behind said tractor wheel, a driving pulley on the tractor, a driven pulley on said cutter bar structure for driving said cutting mechanism, a belt trained over said pulleys for driving said driven pulley, said pivot being so located at one side of a vertical plane passing through the centers of the two pulleys, whereby when said cutter bar structure is swung to said inoperative position, the length of the circuit of said belt around said pulleys is shortened, thereby loosening the belt and interrupting the transmission of power.

27. The mower defined in claim 26 with the further provision of a shield carried by said cutter bar structure at said opposite side of the tractor to receive said tractor wheel to raise the latter over said structure as said structure swings rearwardly to clear an obstruction.

28. In a mower, a supporting structure, a cutter bar structure including cutting mechanism, means pivotally connecting said structures together providing for horizontal swinging movement of the cutter bar structure relative to said supporting structure to an inoperative position when an obstruction is encountered during operation, a driving pulley mounted on said supporting structure, a driven pulley mounted on said cutter bar structure for driving said cutting mechanism, a driving belt trained over said pulleys and having sufficient slack to be ineffective to establish a driving connection between said pulleys when said cutter bar structure is swung to said inoperative position, an idler mounted on one of said structures and positioned to take up the slack in said belt to establish a driving relation between said driving and driven pulleys when said cutter bar structure is in normal operating position, and control means for moving said idler out of belt tightening position to interrupt said driving relation when said cutter bar structure is in its normal operating position.

29. In combination, a mobile frame having a supporting wheel, an implement, and means mounting said implement on said frame ahead of said wheel and providing for rearward movement of the implement relative to said frame as the latter advances, said implement including a part which lies on the ground during said movement for guiding said wheel thereover as said implement moves relative to said frame to a position rearward of said wheel.

30. In combination, a mobile frame having a supporting wheel, an implement disposed generally transversely ahead of said wheel, means pivotally connecting said implement to said frame providing for rearward swinging movement of the implement relative to said frame as the latter advances, and releasable means for connecting said implement to said frame to prevent said movement, said implement including a part which lies on the ground during said swinging movement and has an arc of movement about said pivot connection which passes through the point of contact of said wheel with the ground, whereby said wheel passes over said part as said implement swings relative to said frame to a position rearward of said wheel.

31. A mower comprising a mobile frame having a supporting wheel, cutting mechanism including a cutter bar disposed transversely at one side of said frame in front of said wheel, means pivotally connecting said cutting mechanism at the other side of said frame for rearward swinging movement to a position in rear of said wheel when said cutter bar encounters an obstruction, a sickle cooperable with said cutter bar, and driving means for operating said sickle, said pivotal connecting means being spaced from said wheel a lesser distance than from the outer end of said cutter bar whereby said wheel will run over said cutter bar as said cutting mechanism swings to its position in rear of said wheel.

WILBUR J. COULTAS.

CERTIFICATE OF CORRECTION.

Patent No. 2,292,362.　　　　　　　　　　　　　　August 11, 1942.

WILBUR J. COULTAS.

It is hereby certified that error appears in the printed specification of the above numbered patent requiring correction as follows: Page 1, first column, line 15, for the word "moving" read --mowing--; page 3, first column, line 50, for "below" read --above--; page 7, first column, line 6, claim 22, for "in" read --on--; and that the said Letters Patent should be read with this correction therein that the same may conform to the record of the case in the Patent Office.

Signed and sealed this 6th day of October, A. D. 1942.

(Seal)

Henry Van Arsdale,
Acting Commissioner of Patents.